(12) United States Patent
Kuwada

(10) Patent No.: US 12,430,741 B2
(45) Date of Patent: Sep. 30, 2025

(54) IMAGE QUALITY EVALUATION METHOD, IMAGE QUALITY EVALUATION APPARATUS, AND NON-TRANSITORY COMPUTER READABLE MEDIUM

(71) Applicant: FUJIFILM Business Innovation Corp., Tokyo (JP)

(72) Inventor: Yoshitaka Kuwada, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 342 days.

(21) Appl. No.: 17/887,118

(22) Filed: Aug. 12, 2022

(65) Prior Publication Data
US 2023/0230218 A1    Jul. 20, 2023

(30) Foreign Application Priority Data
Jan. 18, 2022    (JP) ................... 2022-005473

(51) Int. Cl.
| | | |
|---|---|---|
| G06T 7/40 | (2017.01) | |
| G06T 7/00 | (2017.01) | |
| G06T 7/13 | (2017.01) | |
| G06T 7/60 | (2017.01) | |

(52) U.S. Cl.
CPC .............. *G06T 7/0004* (2013.01); *G06T 7/13* (2017.01); *G06T 7/40* (2013.01); *G06T 7/60* (2013.01); *G06T 2207/30144* (2013.01); *G06T 2207/30168* (2013.01)

(58) Field of Classification Search
CPC .... G06T 7/13; G06T 7/40; G06T 7/60; G06T 7/0004
See application file for complete search history.

(56) References Cited

FOREIGN PATENT DOCUMENTS

JP    2007-206459 A    8/2007

OTHER PUBLICATIONS

Ide et al., "Optical Measurement Correlated with the Appearance of Image Height Difference in Glossy Prints," Japan Hardcopy Fall Meeting, 2004, pp. 49-52.
Dalal et al., "Evaluating the Overall Image Quality of Hardcopy Output," IS&T'S 1998 PICS Conference, 1998 [Retrieved from the Internet on Oct. 14, 2022] <https://www.imaging.org/site/PDFs/Papers/1998/PICS-0-43/623.pdf>.
Jun. 20, 2023 Extended Search Report issued in European Patent Application No. 22192719.7.

*Primary Examiner* — Sam Bhattacharya
(74) *Attorney, Agent, or Firm* — Oliff PLC

(57) ABSTRACT

An image quality evaluation method to be executed by an information processing apparatus includes: acquiring information about a step at a boundary portion between an image portion, which is formed using a recording material, and a base material portion, which is a ground of the image portion, and a gloss level of the image portion; and calculating an evaluation value of a relief feel on the basis of the acquired information about the step and the gloss level.

18 Claims, 12 Drawing Sheets

IMAGE QUALITY EVALUATION METHOD, IMAGE QUALITY EVALUATION APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-005473 filed Jan. 18, 2022.

BACKGROUND

(i) Technical Field

The present disclosure relates to an image quality evaluation method, an image quality evaluation apparatus, and a non-transitory computer readable medium.

(ii) Related Art

A relief feel is one of defects caused when an image is formed using toners and pigment inks. The relief feel is had when a step at a boundary portion between a region (hereinafter also referred to as an "image portion") in which toners or pigment inks are fixed and a region (hereinafter also referred to as a "base material portion") in which toners or pigment inks are not fixed is visually detected. The step tends to be large and a relief feel is easily visually recognized in a region at an especially high concentration or a region in which toners or pigment inks in a plurality of colors are stacked. The relief feel is occasionally referred to as a "step feel" or an "uneven feel".

An example of the related art is disclosed in Osamu IDE, Shigeki WASHINO, and Katsuhiko SUGAWARA "Optical Measurement Correlated with the Appearance of Image Height Difference in Glossy Prints", Japan Hardcopy Fall Meeting, pp. 49-52 (2004).

SUMMARY

A relief feel is known to be correlated with the height and the inclination of a step at a boundary portion. However, it is difficult to quantitatively evaluate a relief feel through visual observation. While it is possible to measure the height of a step using a laser displacement gauge or a laser microscope, the evaluation of a relief feel is not determined on the basis of the height of a step alone. For example, a relief feel may be different depending on the difference in the gloss level of an image portion, even if the height of a step is the same.

Aspects of non-limiting embodiments of the present disclosure relate to enabling quantitative evaluation of a relief feel to be made in consideration of the gloss level of an image portion as well, unlike the case where a focus is placed on the height of a step at a boundary portion between the image portion and a base material portion alone.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image quality evaluation method to be executed by an information processing apparatus, the image quality evaluation method including: acquiring information about a step at a boundary portion between an image portion, which is formed using a recording material, and a base material portion, which is a ground of the image portion, and a gloss level of the image portion; and calculating an evaluation value of a relief feel on a basis of the acquired information about the step and the gloss level.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

<Configuration of Image Quality Evaluation Apparatus>

Figure 1:
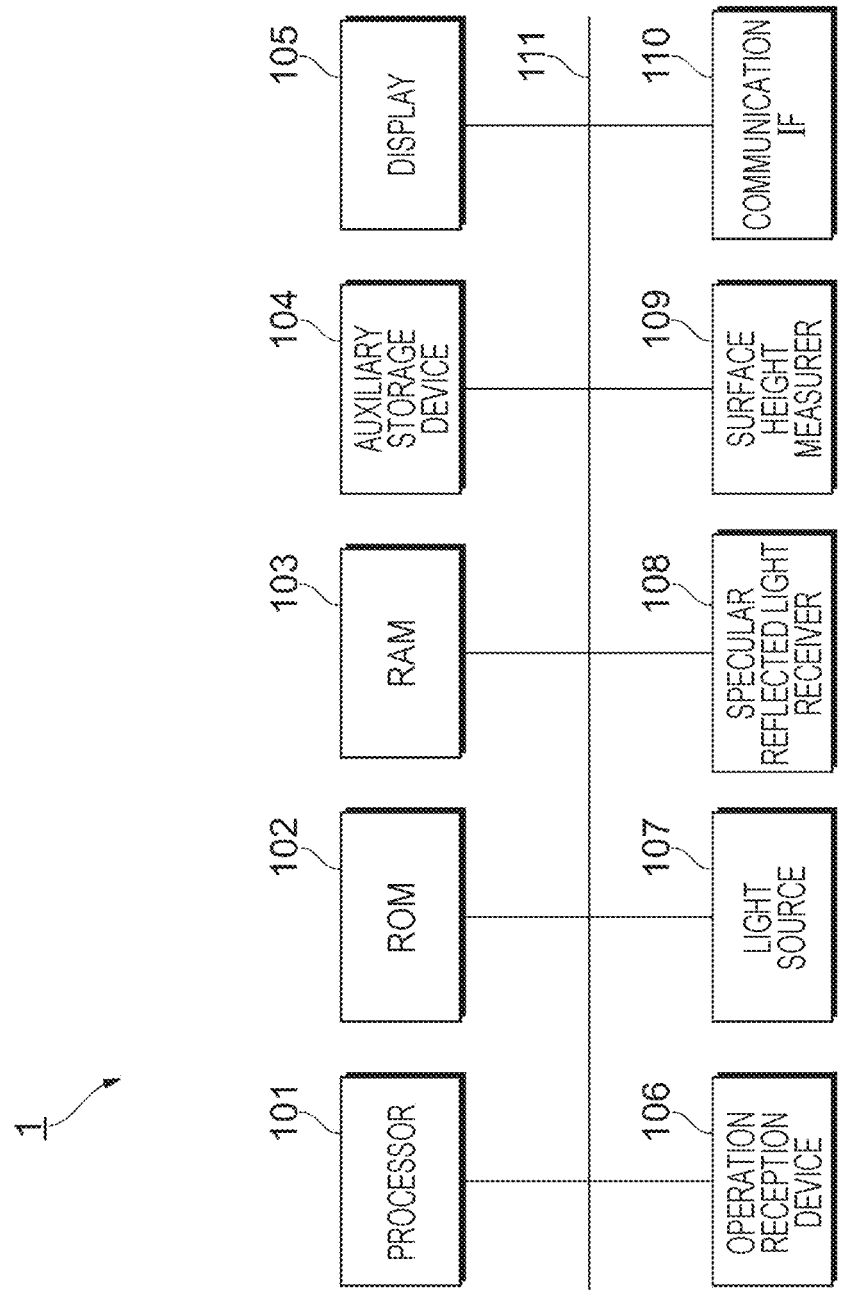
FIG. 1 illustrates an example of the hardware configuration of an image quality evaluation apparatus that is used in various exemplary embodiments.

FIG. 1 illustrates an example of the hardware configuration of an image quality evaluation apparatus 1 that is used in various exemplary embodiments.

The image quality evaluation apparatus 1 illustrated in FIG. 1 is constituted as a device that is independent of a device that prints an image of a document etc. on a base material such as paper.

Hereinafter, the device that prints an image of a document etc. on a base material such as paper will also be referred to as a "printing device" or an "image forming device". Examples of the image of a document etc. include images that include a text, an illustration, a table, a graph, a photograph, and a combination thereof.

The image quality evaluation apparatus 1 illustrated in FIG. 1 includes a processor 101 that controls operation of the entire apparatus, a read only memory (ROM) 102 that stores a basic input output system (BIOS), etc., a random access memory (RAM) 103 that is used as a work area for the processor 101, an auxiliary storage device 104 that stores programs and other data, a display 105 that displays evaluation results and information about operations, an operation reception device 106 that receives an operation by an operator, a light source 107 that generates illumination light, a specular reflected light receiver 108 that receives components of the illumination light specular reflection by a surface of printed matter to be evaluated, a surface height measurer 109 that measures the height of the surface of the printed matter to be evaluated, and a communication interface (IF) 110 that is used for communication with the outside.

The processor 101 and the various portions are connected to each other through a signal line 111 such as a bus.

The processor 101, the ROM 102, and the RAM 103 function as a so-called computer.

The processor 101 implements various functions through execution of the programs. For example, the processor 101 executes a function of calculating an evaluation value of a relief feel of printed matter to be evaluated etc. through execution of the programs.

A semiconductor memory or a hard disk device, for example, is used as the auxiliary storage device 104. The auxiliary storage device 104 stores an operating system, firmware, application programs, etc., in addition to data measured by the specular reflected light receiver 108 and data measured by the surface height measurer 109. Hereinafter, the operating system, the firmware, and the application programs will be collectively referred to as "programs".

The display 105 is a liquid crystal display or an organic electro-luminescence (EL) display, for example, and is used to display a screen to be operated by a user as a person that makes an evaluation. The screen also displays evaluation results including calculated evaluation values.

While the display 105 is provided integrally with an apparatus body in the case of the present exemplary embodiment, the display 105 may be a monitor connected through the communication IF 110, or may be a terminal apparatus connected through the communication IF 110, e.g. a display of a printing device or a computer. The computer is not limited to a desktop computer, and may be a notebook computer or a smartphone.

The operation reception device 106 is constituted of a touch sensor disposed on the display 105 or a physical switch, button, etc. disposed on a housing of the device.

Alternatively, the operation reception device 106 may be a keyboard or a different input device connected to the image quality evaluation apparatus 1, or may be a mouse or a different pointing device.

A device that integrates the display 105 and the operation reception device 106 is called a touch screen. The touch screen is used to receive an operation by the user on a key (hereinafter referred to as a "software key") displayed in a software manner.

In the present exemplary embodiment, a parallel light source is used as the light source 107. Therefore, light rays of illumination light that illuminates the surface of the printed matter are parallel to each other. The term "parallel" is used to mean a practically allowable range of parallelism. In the present exemplary embodiment, a white light source is used as the light source 107.

In the present exemplary embodiment, the light source 107 is disposed at a position at which the light source 107 radiates illumination light at an angle of 60° with respect to the normal to a measurement surface of the printed matter to be evaluated.

The specular reflected light receiver 108 is a device that receives components of the illumination light specular reflection by the surface of the printed matter. A gloss meter that integrates the light source 107 and the specular reflected light receiver 108 may be used, for example.

The specular reflected light receiver 108 according to the present exemplary embodiment is provided at a position at which the specular reflected light receiver 108 receives components of the illumination light reflected in the direction at 60° with respect to the normal to the measurement surface.

The light source 107 and the specular reflected light receiver 108 are disposed in the same plane. The light source 107 and the specular reflected light receiver 108 are an example of a second measurement unit.

While an angle of 60° is used as the measurement angle in the present exemplary embodiment, a different angle may also be used. Angles of 20°, 45°, 75°, and 85° may also be used, for example.

The measurement angle may not be fixed, and may be switchable in accordance with the printed matter to be evaluated. The switching of the measurement angle may be executed on the basis of an operation by the user, or may be executed through control by the processor 101 in accordance with the amount of received light.

The surface height measurer 109 is a device that measures displacement of roughness on the surface of the printed matter with respect to the scanning direction. The surface height measurer 109 is an example of a first measurement unit.

The communication IF 110 is constituted of a module that conforms to a wired or wireless communication standard. An Ethernet (registered trademark) module, a Universal Serial Bus (USB) module, a wireless Local Area Network (LAN) module, etc. may be used for the communication IF 110, for example.

<Sectional Structure of Region Portion to Be Evaluated and Relationship among Physical Amounts>

Figure 2:
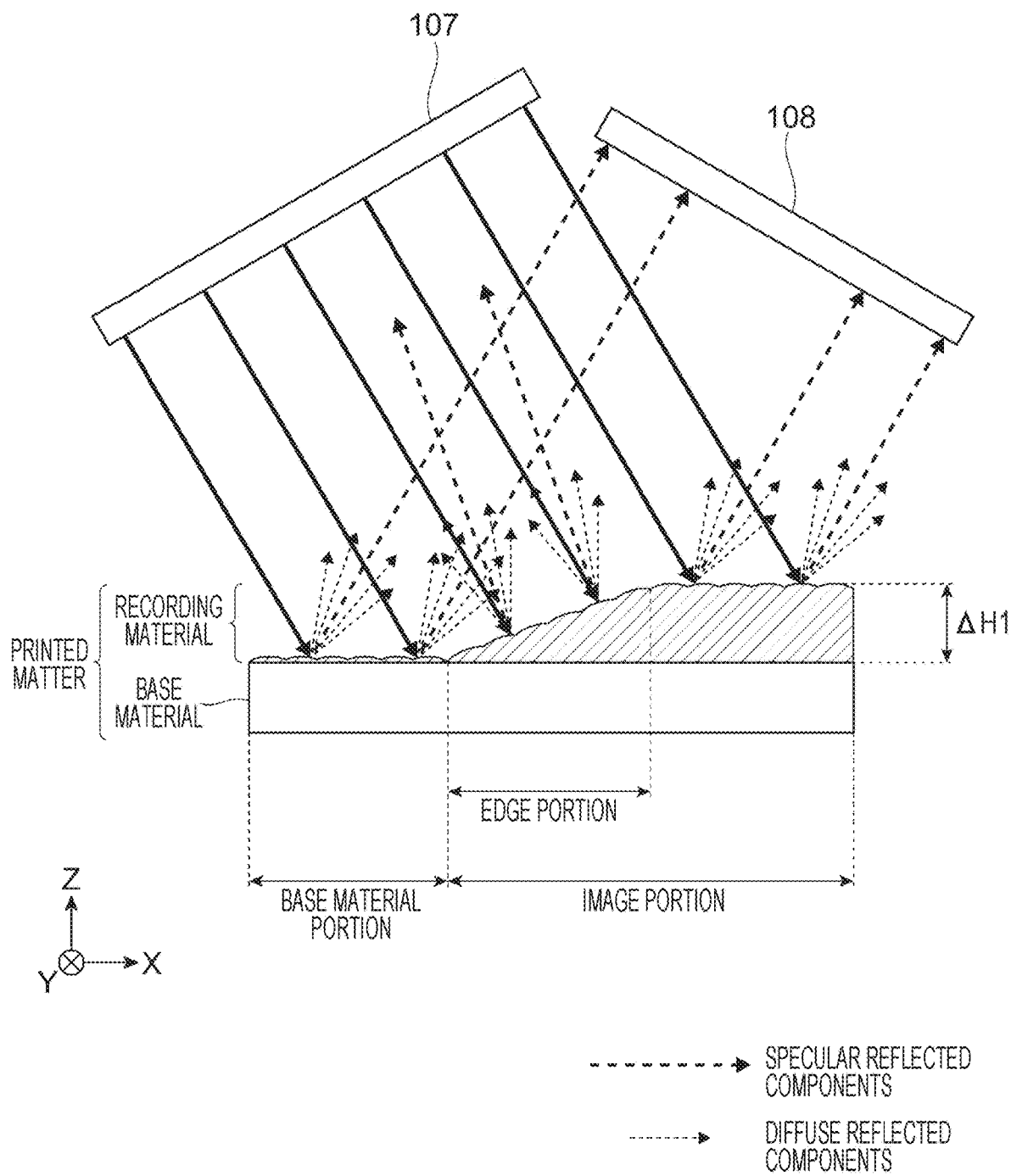
FIG. 2 schematically illustrates an example of the sectional structure of printed matter at a portion at which a relief feel tends to appear.

FIG. 2 schematically illustrates an example of the sectional structure of printed matter at a portion at which a relief feel tends to appear. In FIG. 2, the inclination formed at an end portion of a recording material stacked on the surface of a base material is expressed as exaggerated.

In the case of the present exemplary embodiment, examples of the base material include paper, a film, and metal paper.

The paper is classified in accordance with the paper quality and the thickness.

Examples of the film include a polyethylene terephthalate (PET) film, a polypropylene (PP) film, and a polyvinyl chloride (PVC) film.

Examples of the metal paper include paper with a surface to which a paint containing a pearl pigment has been applied, paper with a surface to which an aluminum foil has been pasted, paper to which a PET film with a surface onto which an aluminum layer has been evaporated has been pasted, paper with a surface to which a holographic film has been pasted, and paper obtained by pasting thereto a PET film with a surface onto which an aluminum layer has been evaporated and thereafter removing only the film to leave only the evaporated layer on the surface thereof.

Examples of the recording material include toners and inks. The toners are used for electrophotography, and the inks are used for offset printing and inkjet printing.

In the example illustrated in FIG. 2, a boundary portion between the surface of the base material and the recording material stacked on the surface of the base material is enlarged.

In FIG. 2, a region in which the base material is exposed is referred to as a "base material portion", and a region in which the surface of the base material is covered by the recording material is referred to as an "image portion". In FIG. 2, in addition, a connection portion with the base material portion formed at an end portion of the image portion is referred to as an "edge portion". The thickness of the edge portion becomes thinner toward an outer edge portion.

In the case of FIG. 2, the thickness of the recording material stacked on the surface of the base material is represented as a step height ΔH1 of a step between the surface of the base material and the upper surface of the image portion. The step height ΔH1 is measured by the surface height measurer 109. The step height ΔH1 is an example of information about the step.

In FIG. 2, light rays of the illumination light output from the light source 107 and light paths of light reflected by the base material portion and the image portion are also illustrated. Specular reflected components and diffuse reflected components are generated at any location. In the case of FIG. 2, specular reflected components from the surface region of the base material portion and specular reflected components from the surface region of the image portion excluding the edge portion are incident on the specular reflected light receiver 108, and specular reflected components from the surface region of the edge portion are not incident on the specular reflected light receiver 108.

The inclination angle of the edge portion may be calculated from the length of the edge portion in the X-axis direction and the step height ΔH1, for example. The inclination angle of the edge portion is larger as the step height ΔH1 is higher if the length of the edge portion in the X-axis direction is the same, and is larger as the length of the edge portion in the X-axis direction is shorter if the step height ΔH1 is the same. The inclination angle of the edge portion is also an example of information about the step.

Figure 3:
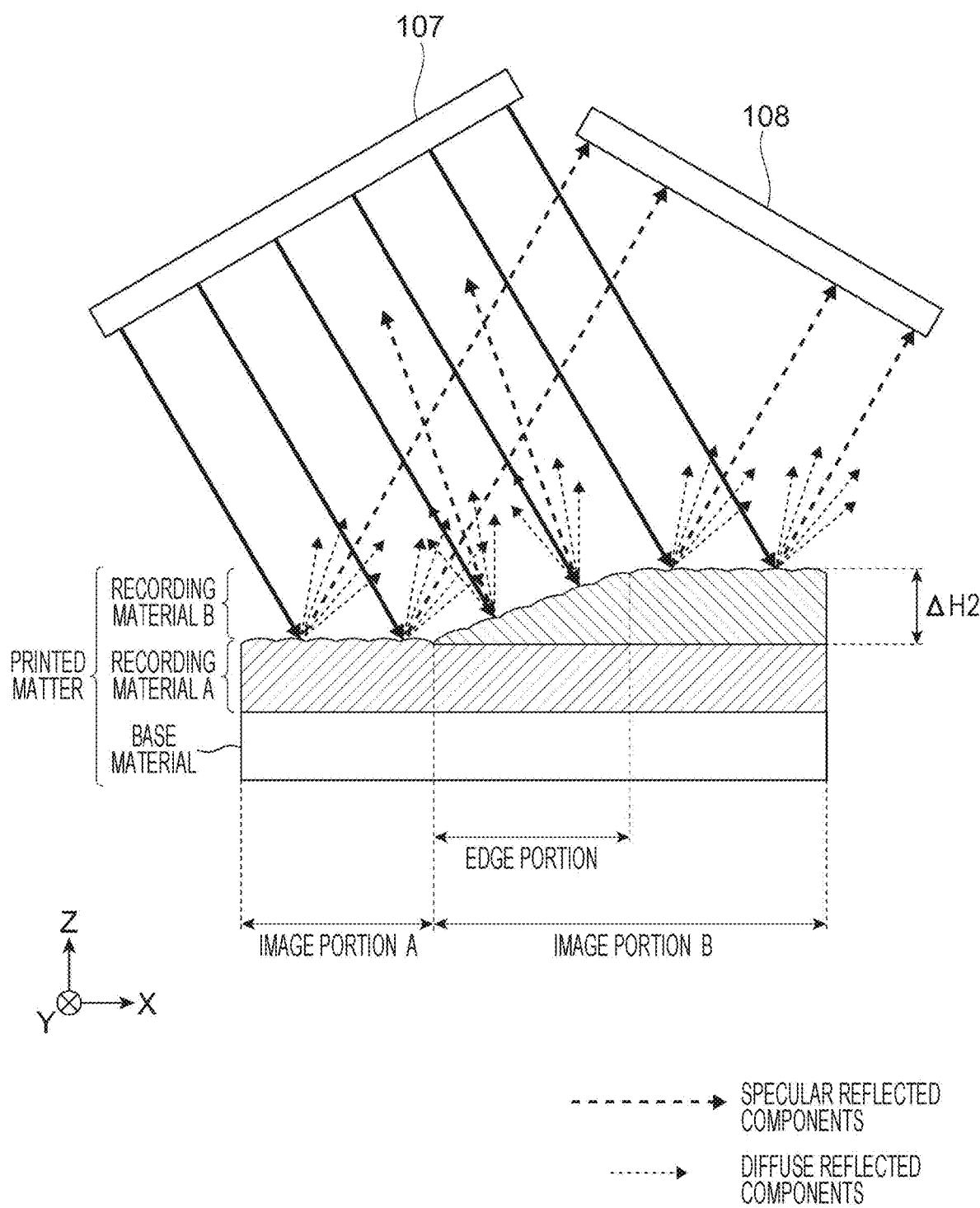
FIG. 3 schematically illustrates another example of the sectional structure of printed matter at a portion at which a relief feel tends to appear.

FIG. 3 schematically illustrates another example of the sectional structure of printed matter at a portion at which a relief feel tends to appear. Portions in FIG. 3 corresponding to those in FIG. 2 are denoted by the corresponding reference numerals.

In FIG. 3, a recording material A is stacked on the surface of the base material, and a different recording material B is stacked on a part of the surface of the recording material A.

In the case of FIG. 3, the specular reflected light receiver 108 receives specular reflected components from the surface region of the image portion A and specular reflected components from the upper surface of the image portion B, but specular reflected components from the surface region of the edge portion are not incident on the specular reflected light receiver 108.

In FIG. 3, a step height of a step at the boundary portion between the recording material A and the recording material B is represented as ΔH2. The height ΔH2 is also measured by the surface height measurer 109. The step height ΔH2 is an example of information about the step.

Figure 4:
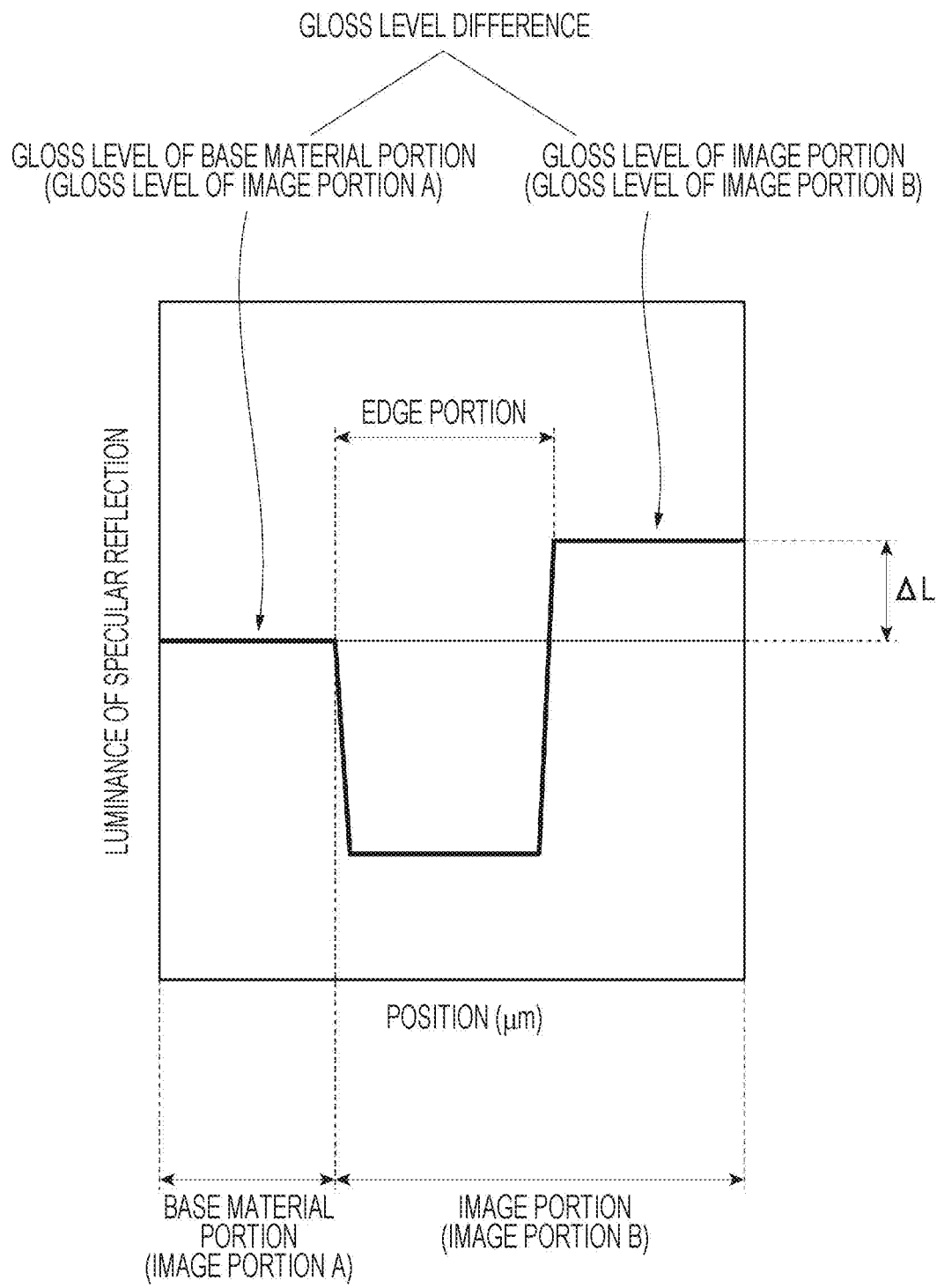
FIG. 4 illustrates an example of an output profile of a specular reflected light receiver.

FIG. 4 illustrates an example of an output profile of the specular reflected light receiver 108. The vertical axis represents the luminance value of specular reflection, and the horizontal axis represents the position of the region portion that is used for evaluation.

The luminance value becomes larger toward the upper end, and becomes smaller toward the lower end. The position is given in the unit of microns (μm).

The output profile indicated in FIG. 4 corresponds to the sectional structures illustrated in FIGS. 2 and 3. The luminance value of specular reflection measured by the specular reflected light receiver 108 is the largest at the upper portion of the image portion as the upper surface, the second largest at the base material portion and the portion of the lower image portion as the lower surface, and the smallest at the edge portion.

In the exemplary embodiments to be discussed later, the luminance value corresponding to the upper surface is used as a "gloss level" of the image portion, and the difference of the gloss level of the upper surface from the gloss level of the lower surface is used as a "gloss level difference".

Figure 5A:
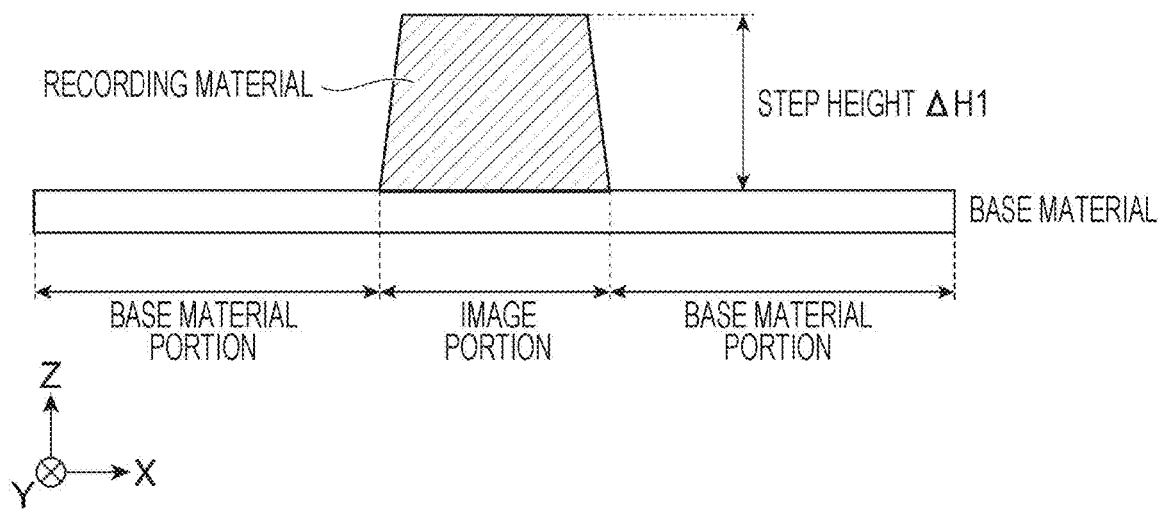
FIGS. 5A and 5B illustrate an example of measurement performed by a surface height measurer, with FIG. 5A illustrating an example of the sectional structure of a region portion to be measured and with FIG. 5B illustrating an example of a measured waveform.
Figure 5B:
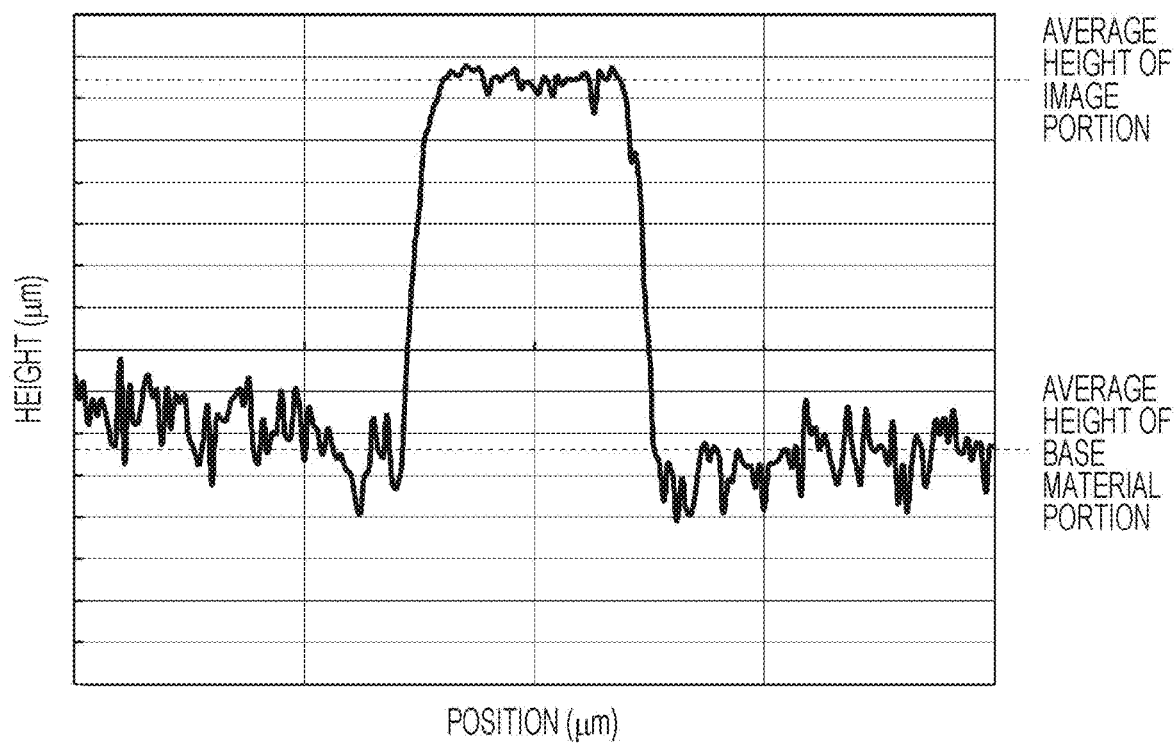

FIGS. 5A and 5B illustrate an example of measurement performed by the surface height measurer 109. FIG. 5A illustrates an example of the sectional structure of a region portion to be measured, and FIG. 5B illustrates an example of a measured waveform.

In the example illustrated in FIG. 5A, the step height ΔH1 of a step formed between the surface of the base material and the upper surface of the recording material is to be measured.

In FIG. 5B, the vertical axis represents the height of a surface measured by the surface height measurer 109, and the horizontal axis represents the position of the region portion that is used for evaluation. The height of a surface becomes higher toward the upper end, and becomes lower toward the lower end. The position is given in the unit of microns (μm).

As indicated in FIG. 5B, the measured waveform appears as a waveform that reflects fine roughness on the surface. In the following description, the difference between the average height of the image portion and the average height of the base material portion is used as the step height ΔH1 of the step between the base material portion and the image portion.

<Example of Printed Matter for Evaluation>

In the exemplary embodiments to be discussed later, dedicated printed matter is prepared for evaluation of a relief feel.

Figure 6:
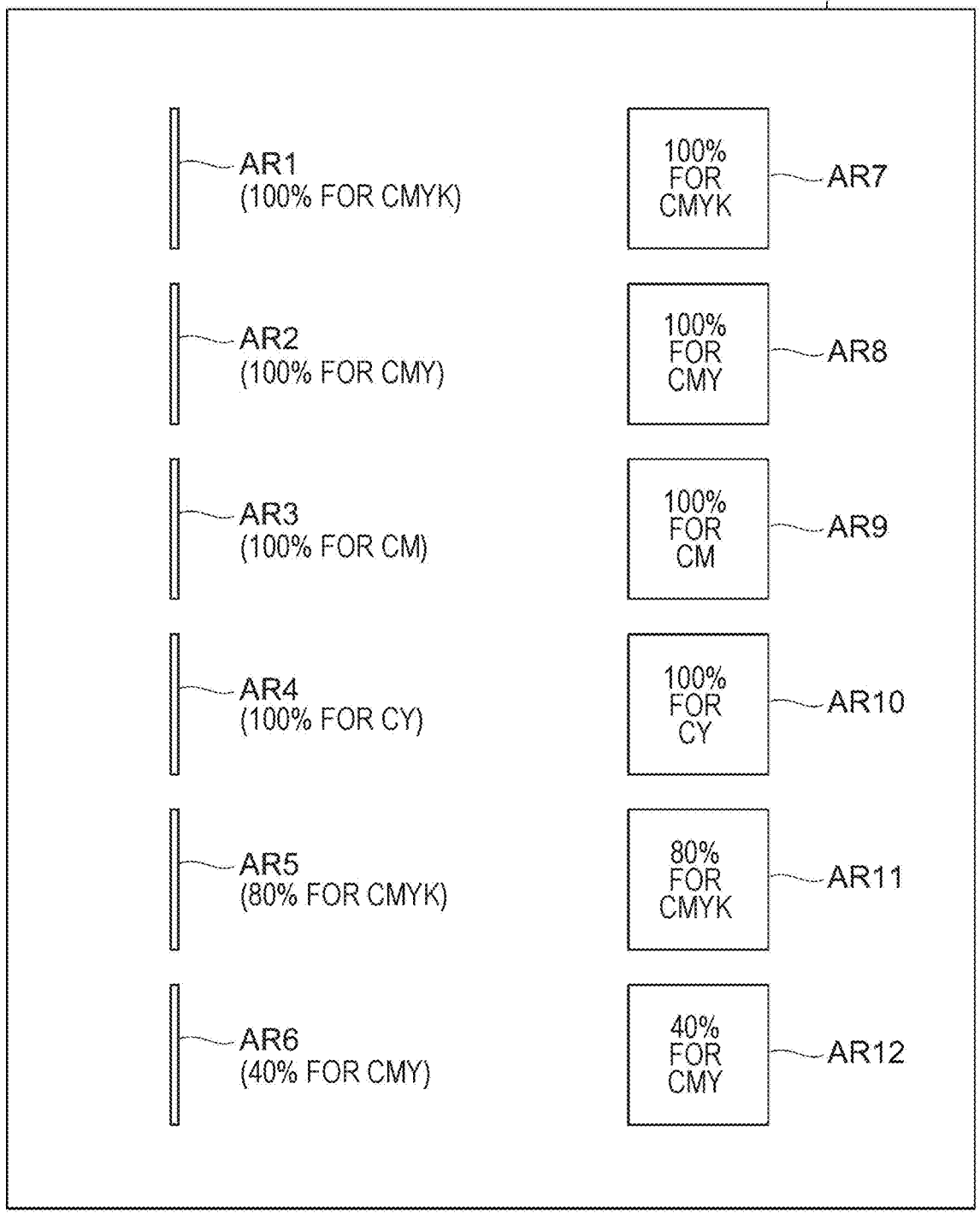
FIG. 6 illustrates an example of the layout of printed matter for evaluation.

FIG. 6 illustrates an example of the layout of printed matter for evaluation. In the case of FIG. 6, patterns AR1 to AR12 of image data that tend to present a relief feel are disposed on the surface of a recording material. The patterns AR1 to AR6 are used to measure a step height ΔH, and the patterns AR7 to AR12 are used to measure a gloss level.

In the case of FIG. 6, the patterns that are used to measure a step height ΔH are linear patterns, and the patterns that are used to measure a gloss level are rectangular patterns.

The patterns AR1 and AR7 are patterns given at a tone level of 100% for each of cyan (C), magenta (M), yellow (Y), and black (K) in image data to be handled by a computer or other information processing apparatuses.

The patterns AR2 and AR8 are patterns given at a tone level of 100% for three colors, namely cyan (C), magenta (M), and yellow (Y).

The patterns AR3 and AR9 are patterns given at a tone level of 100% for two colors, namely cyan (C) and magenta (M).

The patterns AR4 and AR10 are patterns given at a tone level of 100% for two colors, namely cyan (C) and yellow (Y).

The patterns AR5 and AR11 are patterns given at a tone level of 100% for four colors, namely cyan (C), magenta (M), yellow (Y), and black (K).

The patterns AR6 and AR12 are patterns given at a tone level of 40% for three colors, namely cyan (C), magenta (M), and yellow (Y).

The film thickness of the image portion stacked on the surface of the base material becomes thicker as the number of colors of recording materials that are used for printing is increased if the tone level of the image data is the same. Thus, the film thickness of a pattern printed in two colors (hereinafter also referred to as a "secondary color") is thicker than the film thickness of a pattern printed in a single color. Similarly, the film thickness of a pattern printed in three colors (hereinafter also referred to as a "tertiary color") is thicker than the film thickness of a pattern printed in two colors, and the film thickness of a pattern printed in four colors (hereinafter also referred to as a "quaternary color") is thicker than the film thickness of a pattern printed in three colors.

The film thickness of the image portion stacked on the surface of the recording material is proportional to the magnitude of the tone level of the image data corresponding to each color. Thus, the film thickness of a pattern printed at 80% is thicker than the film thickness of a pattern printed at 40%, and the film thickness of a pattern printed at 100% is thicker than the film thickness of a pattern printed at 80%.

In practice, however, the film thickness is non-linear with respect to an increase in the number of colors or an increase in the tone level because of constraints on the side of a printing device or an image forming device.

First Exemplary Embodiment

Figure 7:
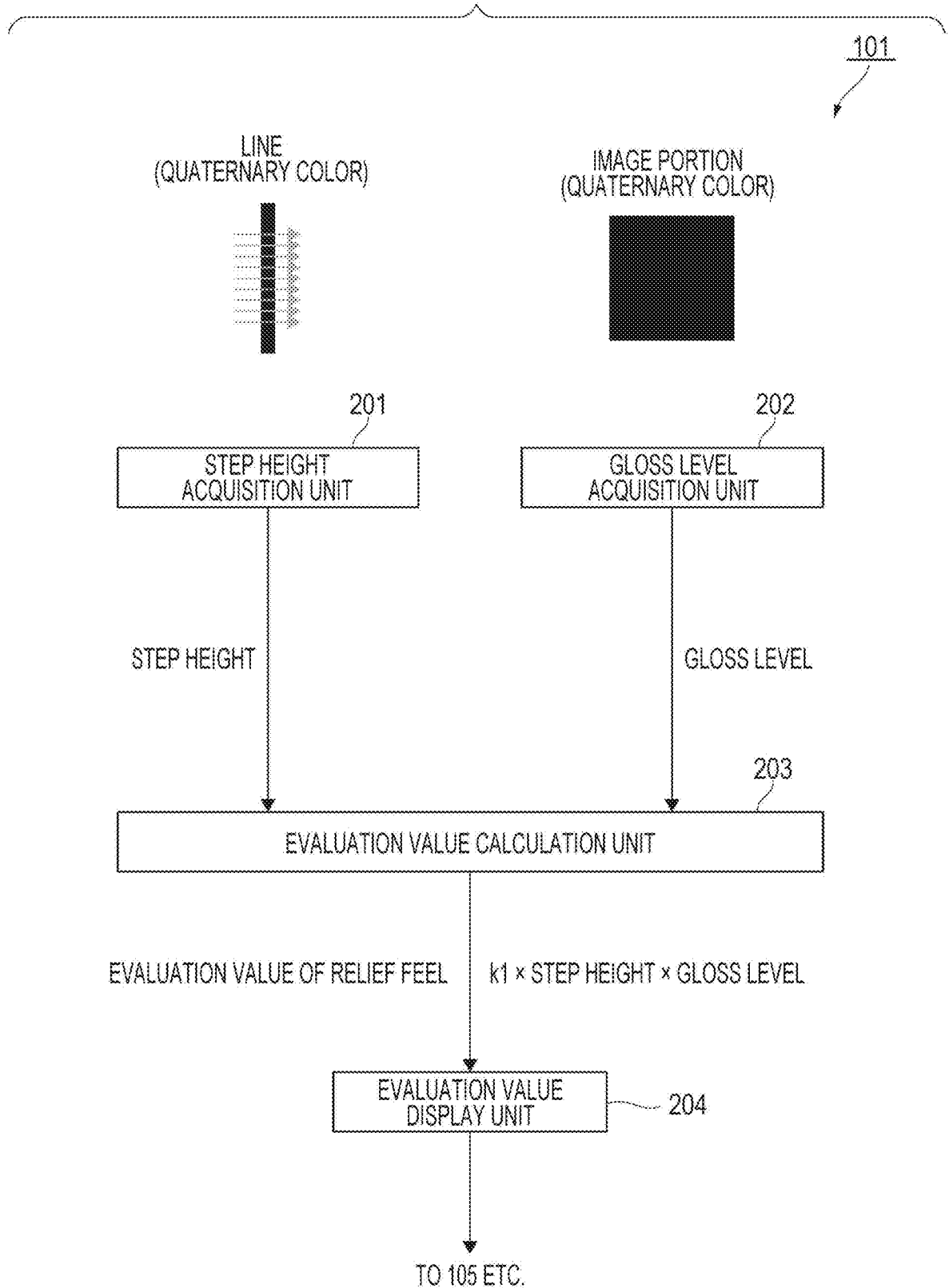
FIG. 7 illustrates an example of the functional configuration of an image quality evaluation apparatus according to a first exemplary embodiment.

FIG. 7 illustrates an example of the functional configuration of an image quality evaluation apparatus 1 according to a first exemplary embodiment. The functional components illustrated in FIG. 7 are implemented through execution of programs by the processor 101 (see FIG. 1).

The processor 101 according to the first exemplary embodiment functions as a step height acquisition unit 201, a gloss level acquisition unit 202, an evaluation value calculation unit 203, and an evaluation value display unit 204.

The step height acquisition unit 201 acquires the height of a step formed between the base material portion and the image portion from information on roughness on the surface of the printed matter measured by the surface height measurer 109 (see FIG. 1). In the case where the printed matter to be evaluated has the layout illustrated in FIG. 6, the step height acquisition unit 201 acquires the height of a portion with the highest step height, that is, the height of the pattern AR1 (see FIG. 6) corresponding to a quaternary color.

The gloss level acquisition unit 202 acquires the gloss level of the image portion, the step height of which has been acquired, or the gloss level of a different image portion printed under the same condition. In the present exemplary embodiment, the gloss level of the pattern AR7 (see FIG. 6) corresponding to a quaternary color is acquired.

In the case where the printed matter to be evaluated has the layout, the gloss level acquisition unit 202 acquires the gloss level of the pattern AR1 or the gloss level of the pattern AR7 which is a different pattern printed under the same condition as the pattern AR1.

Being "printed under the same condition" means being printed on the same base material using recording materials in the same colors at the same tone level.

The evaluation value calculation unit 203 calculates an evaluation value of a relief feel on the basis of the acquired step height and gloss level. Specifically, the evaluation value calculation unit 203 calculates an evaluation value of a relief feel using the following formula.

$$\text{Evaluation value} = k1 \times \text{step height} \times \text{gloss level} \quad \text{(Formula 1)}$$

In the formula, k1 is a coefficient. The value of k1 is given in advance.

The evaluation value display unit 204 displays the calculated evaluation value of the printed matter on the display 105 etc. The evaluation value may be used as an evaluation value for the specific printing device that is used to print the printed matter, or may be used as an evaluation value for the recording material that is used in the printing.

In the present exemplary embodiment, the evaluation value display unit 204 displays the calculated evaluation value in association with two types of curves that represent the degree of visible recognition of a relief feel.

One of the two types of curves is a curve that gives a lower limit value (hereinafter referred to as a "detection limit") of the evaluation value that allows a person to notice a relief feel. The other one is a curve that gives an upper limit value (hereinafter referred to as an "allowable limit") of the evaluation value that defines a relief feel that allows visual recognition.

Figure 8:
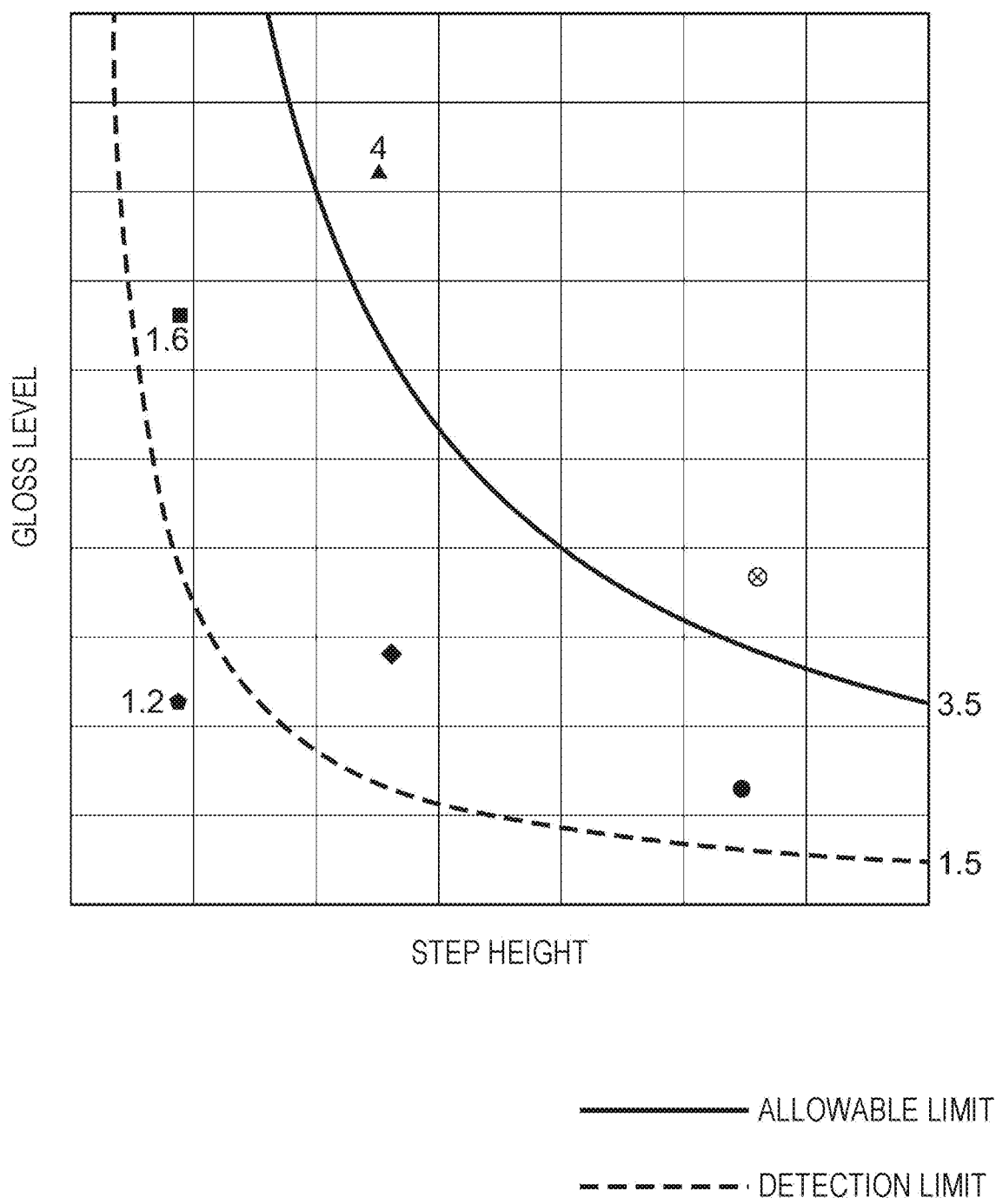
FIG. 8 illustrates an example of evaluation values to be output.

FIG. 8 illustrates an example of evaluation values to be output. The vertical axis represents the gloss level, and the horizontal axis represents the step height. The gloss level becomes higher toward the upper end of the chart, and becomes lower toward the lower end. The step height becomes higher toward the right end of the chart, and becomes lower toward the left end. The horizontal axis is an example of a first axis, and the vertical axis is an example of a second axis.

The two-axis graph indicated in FIG. 8 indicates a curve that gives the detection limit of a relief feel and a curve that gives the allowable limit determined in terms of quality.

In the case of FIG. 8, the curve that gives the detection limit corresponds to an evaluation value of "1.5", and the curve that gives the allowable limit corresponds to an evaluation value of "3.5".

A relief feel is detected more easily as the step height is higher, even if the gloss level of the image portion is low. On the other hand, a relief feel is not detected easily when the step height is low, even if the gloss level of the image portion is high.

A relief feel is not detected for printed matter with an evaluation value positioned below the curve that gives the detection limit. In the case of FIG. 8, for example, a relief feel is not detected for printed matter with a calculated evaluation value of "1.2".

On the contrary, a relief feel is visually recognized for printed matter with an evaluation value positioned in the range between the curve that gives the detection limit and the curve that gives the allowable limit, but the printed matter is allowable in terms of quality.

Printed matter with an evaluation value positioned above the curve that gives the allowable limit is printed matter with too conspicuous a relief feel to be allowed from the viewpoint of quality.

Second Exemplary Embodiment

Figure 9:
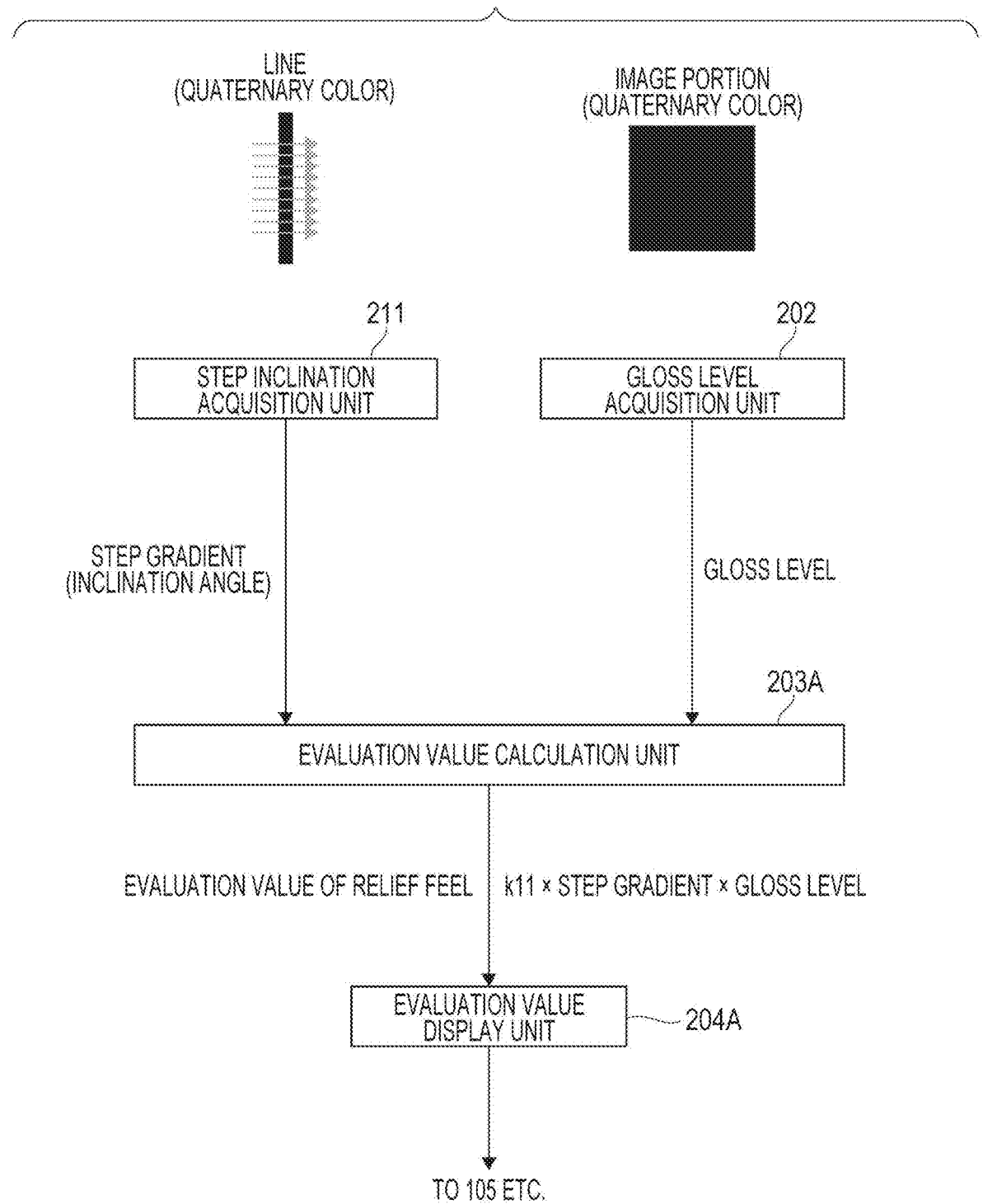
FIG. 9 illustrates an example of the functional configuration of an image quality evaluation apparatus according to a second exemplary embodiment.

FIG. 9 illustrates an example of the functional configuration of an image quality evaluation apparatus 1 according to a second exemplary embodiment. Portions in FIG. 9 corresponding to those in FIG. 7 are denoted by the corresponding reference numerals.

The functional components illustrated in FIG. 9 are also implemented through execution of programs by the processor 101 (see FIG. 1).

The processor 101 according to the second exemplary embodiment functions as a step inclination acquisition unit 211, a gloss level acquisition unit 202, an evaluation value calculation unit 203A, and an evaluation value display unit 204A.

The present exemplary embodiment is different from the first exemplary embodiment in that an evaluation value of a relief feel is calculated using the tilt of a step, that is, the inclination angle, in place of the height of a step.

In the present exemplary embodiment, to this end, the step inclination acquisition unit 211 is used in place of the step height acquisition unit 201 (see FIG. 7).

The step inclination acquisition unit 211 calculates an inclination angle on the basis of the length of an edge portion in the horizontal direction and the step height.

The evaluation value calculation unit 203A calculates an evaluation value of a relief feel on the basis of the acquired step tilt and gloss level. Specifically, the evaluation value calculation unit 203A calculates an evaluation value of a relief feel using the following formula.

$$\text{Evaluation value} = k11 \times \text{step tilt} \times \text{gloss level} \quad \text{(Formula 2)}$$

In the formula, k11 is a coefficient. The value of k11 is given in advance.

The evaluation value display unit 204A displays the calculated evaluation value of the printed matter on the display 105 etc.

Also in the present exemplary embodiment, the evaluation value display unit 204A displays the calculated evaluation value in association with two types of curves that represent the degree of visible recognition of a relief feel.

Specifically, the evaluation value display unit 204A defines the horizontal axis of the two-axis graph indicated in FIG. 8 as the step tilt, and displays a symbol that represents the printed matter to be evaluated and a calculated evaluation value on the two-axis graph.

Third Exemplary Embodiment

Figure 10:
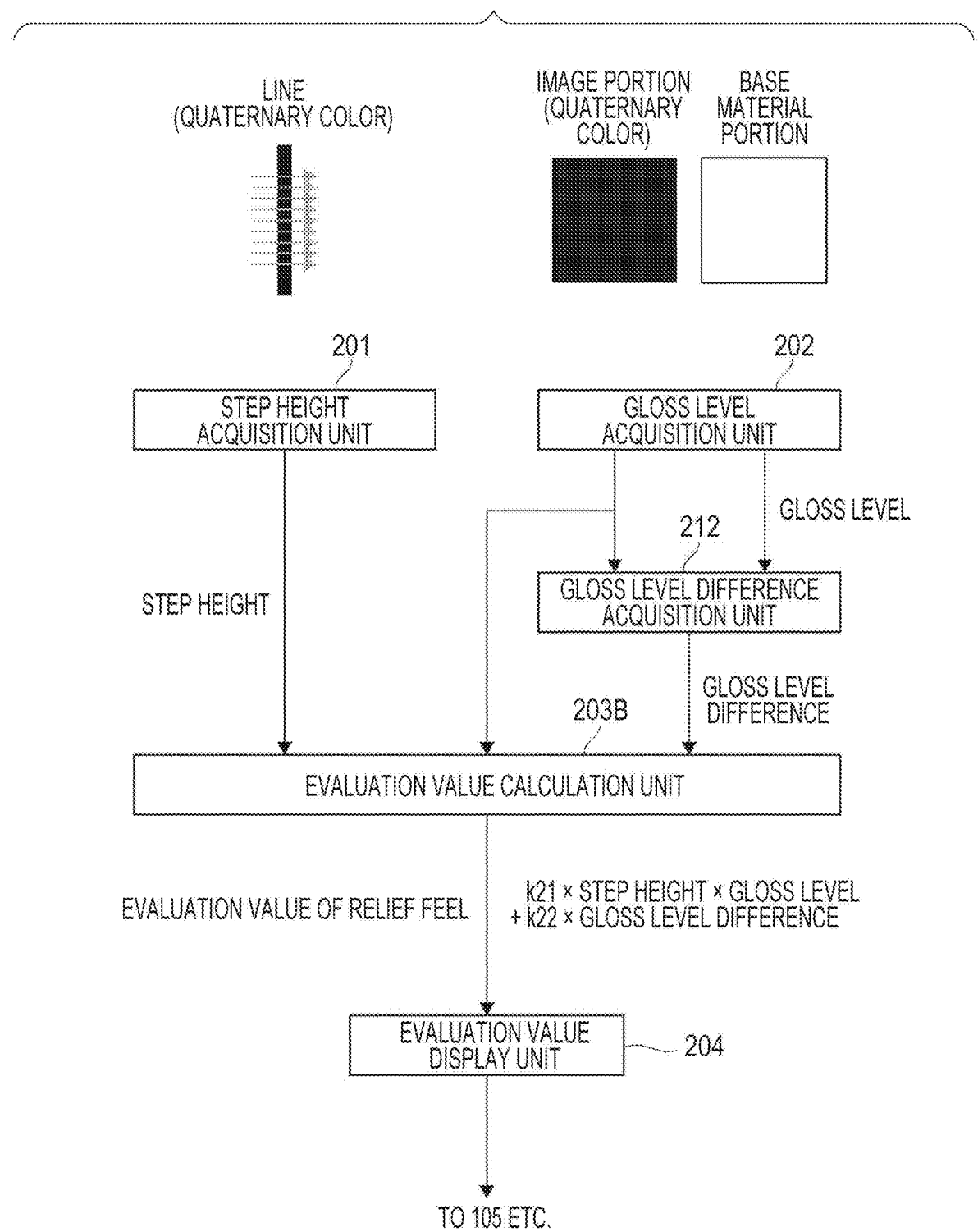
FIG. 10 illustrates an example of the functional configuration of an image quality evaluation apparatus according to a third exemplary embodiment.

FIG. 10 illustrates an example of the functional configuration of an image quality evaluation apparatus 1 according to a third exemplary embodiment. Portions in FIG. 10 corresponding to those in FIG. 7 are denoted by the corresponding reference numerals.

The functional components illustrated in FIG. 10 are also implemented through execution of programs by the processor 101 (see FIG. 1).

The processor 101 according to the third exemplary embodiment functions as a step height acquisition unit 201, a gloss level acquisition unit 202, a gloss level difference acquisition unit 212, an evaluation value calculation unit 203B, and an evaluation value display unit 204.

The present exemplary embodiment is different from the first exemplary embodiment in that the gloss level difference acquisition unit 212 calculates a difference between the gloss level of the image portion and the gloss level of the base material portion, that is, a gloss level difference, and gives the calculated gloss level difference to the evaluation value calculation unit 203B. In the present exemplary embodiment, in other words, an evaluation value of a relief feel is calculated using the gloss level difference as well.

The evaluation value calculation unit 203B calculates an evaluation value of a relief feel on the basis of the acquired step height, gloss level of the image portion, and gloss level difference. Specifically, the evaluation value calculation unit 203B calculates an evaluation value of a relief feel using the following formula.

$$\text{Evaluation value} = k21 \times \text{step height} \times \text{gloss level} + k22 \times \text{gloss level difference} \quad \text{(Formula 3)}$$

In the formula, k21 and k22 are each a coefficient. The values of k21 and k22 are given in advance.

The evaluation value calculation unit 203B according to the present exemplary embodiment calculates an evaluation value using the gloss level difference between the base material portion and the image portion in a quaternary color as a constant.

In the case where the gloss level difference between the base material portion and the image portion is large, for example, the overall evaluation value has a large value, even if the evaluation value calculated using Formula 1 is small. This is because a relief feel is easily visually recognized when the difference between the gloss level of the base material portion and the gloss level of the image portion in a quaternary color is large.

In the case where the gloss level difference between the base material portion and the image portion is small, on the other hand, the evaluation value calculated using Formula 3 is close to the evaluation value calculated using Formula 1.

While an evaluation value is calculated using the step height in the present exemplary embodiment, an evaluation value may be calculated using the step tilt as in the second exemplary embodiment.

Fourth Exemplary Embodiment

Figure 11:
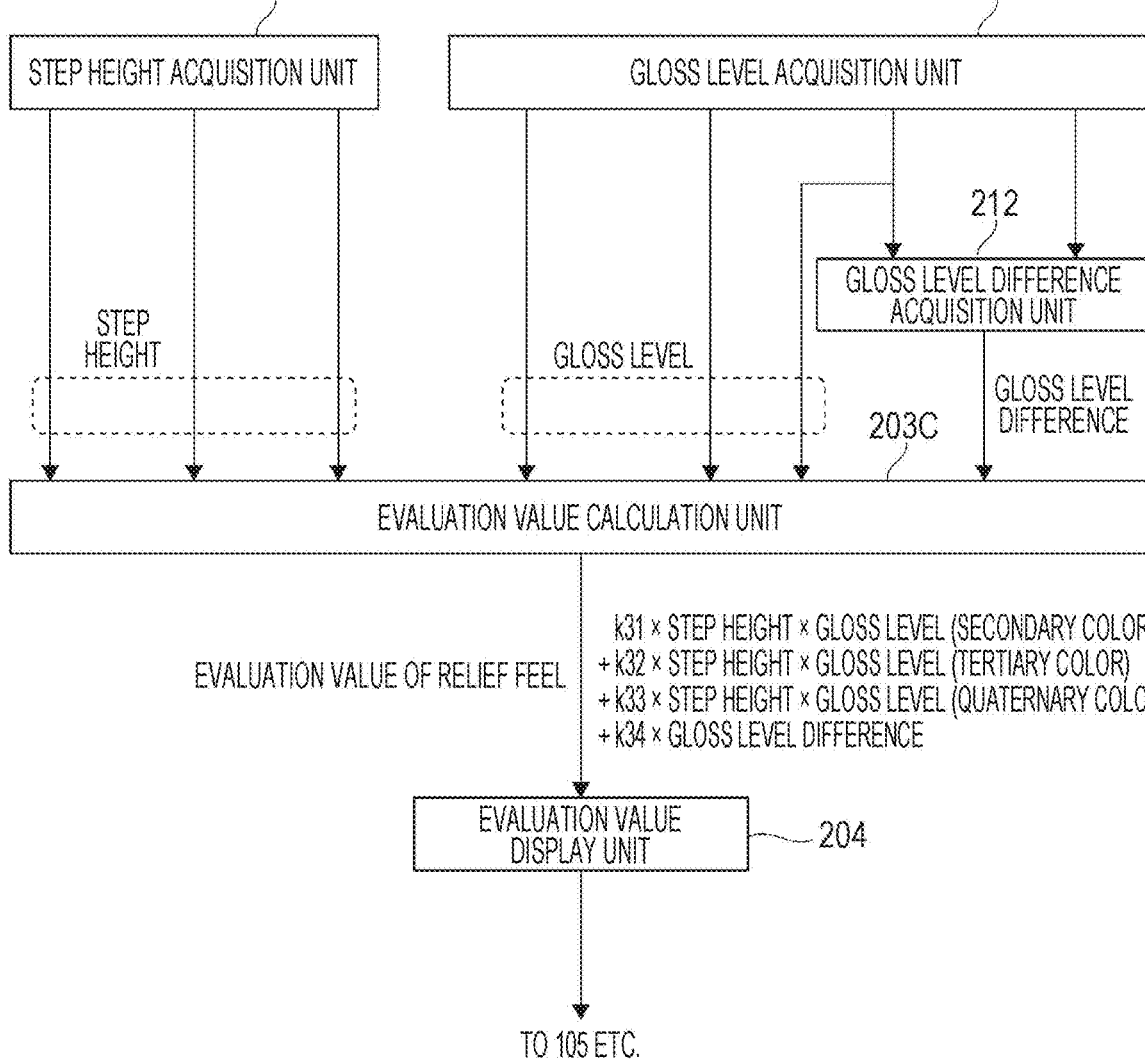
FIG. 11 illustrates an example of the functional configuration of an image quality evaluation apparatus according to a fourth exemplary embodiment.

FIG. 11 illustrates an example of the functional configuration of an image quality evaluation apparatus 1 according to a fourth exemplary embodiment. Portions in FIG. 11 corresponding to those in FIG. 10 are denoted by the corresponding reference numerals.

The functional components illustrated in FIG. 11 are also implemented through execution of programs by the processor 101 (see FIG. 1).

The processor 101 according to the fourth exemplary embodiment functions as a step height acquisition unit 201A, a gloss level acquisition unit 202A, a gloss level difference acquisition unit 212, an evaluation value calculation unit 203C, and an evaluation value display unit 204.

The present exemplary embodiment is different from the first exemplary embodiment in that an overall evaluation value is calculated by measuring a step height and a gloss level for a plurality of patterns with different numbers of stacked recording materials.

In the case of FIG. 11, the step height acquisition unit 201A acquires a step height corresponding to each of a line printed in a secondary color, a line printed in a tertiary color, and a line printed in a quaternary color.

The line printed in a secondary color is a line corresponding to the pattern AR3 or AR4 (see FIG. 6). This line corresponds to a line formed by stacking recording materials corresponding to two types of colors given at a tone level of 100%. The step height corresponding to the line in a secondary color is roughly twice the step height corresponding to a line in a primary color.

The line printed in a tertiary color is a line corresponding to the pattern AR2 (see FIG. 6). This line corresponds to a line formed by stacking recording materials corresponding to three types of colors given at a tone level of 100%. The step height corresponding to the line in a tertiary color is higher than that for a line in a secondary color, but is not necessarily roughly three times the step height corresponding to a line in a primary color because of constraints on the side of a printing device.

The gloss level acquisition unit 202A acquires a gloss level of the pattern AR9 or AR10 corresponding to a secondary color, a gloss level of the pattern AR8 corresponding to a tertiary color, a gloss level of the pattern AR7 corresponding to a quaternary color, and a gloss level of the base material portion.

The evaluation value calculation unit 203C calculates an evaluation value of a relief feel on the basis of the acquired three types of step heights, gloss levels of three types of image portions corresponding thereto, and gloss level difference between the image portion in a quaternary color and the base material portion. Specifically, the evaluation value calculation unit 203C calculates an evaluation value of a relief feel using the following formula.

Evaluation value=$k31$×step height×gloss level (secondary color)+$k32$×step height×gloss level (tertiary color)+$k33$×step height×gloss level (quaternary color)+$k34$×gloss level difference (Formula 4)

In the formula, k31, k32, k33, and k34 are each a coefficient. The values of k31, k32, k33, and k34 are given in advance.

The evaluation value calculation unit 203C according to the present exemplary embodiment also calculates an evaluation value using the gloss level difference between the base material portion and the image portion in a quaternary color as a constant.

The evaluation value calculation unit 203C according to the present exemplary embodiment is able to calculate an overall evaluation value, including an evaluation value for a secondary color, an evaluation value for a tertiary color, and an evaluation value for a quaternary color. While a plurality of steps and image portions with different heights are formed on the actual printed matter, it is possible to make an overall evaluation of a relief feel using Formula 4.

While an evaluation value is calculated using the step height in the present exemplary embodiment, an evaluation value may be calculated using the step tilt as in the second exemplary embodiment.

Fifth Exemplary Embodiment

Figure 12:
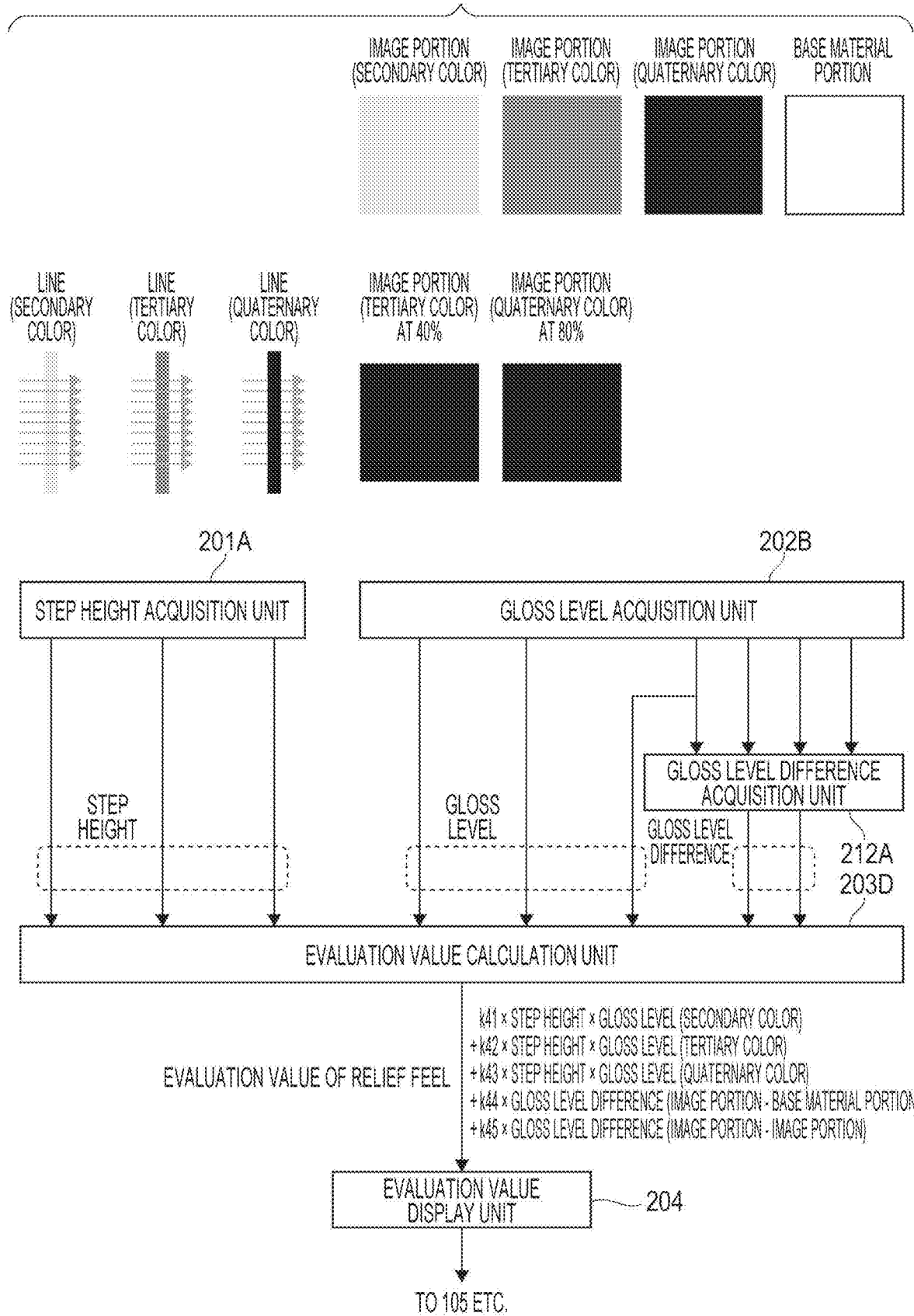
FIG. 12 illustrates an example of the functional configuration of an image quality evaluation apparatus according to a fifth exemplary embodiment.

FIG. 12 illustrates an example of the functional configuration of an image quality evaluation apparatus 1 according to a fifth exemplary embodiment. Portions in FIG. 12 corresponding to those in FIG. 11 are denoted by the corresponding reference numerals.

The functional components illustrated in FIG. 12 are also implemented through execution of programs by the processor 101 (see FIG. 1).

The processor 101 according to the fifth exemplary embodiment functions as a step height acquisition unit 201A, a gloss level acquisition unit 202B, a gloss level difference acquisition unit 212A, an evaluation value calculation unit 203D, and an evaluation value display unit 204.

The present exemplary embodiment is different from the fourth exemplary embodiment in that an overall evaluation value is calculated in consideration of the gloss level difference between an image portion for which the total amount of recording materials used is smaller and an image portion for which the total amount of recording materials used is larger.

In the case of FIG. 12, the gloss level acquisition unit 202B acquires a gloss level of the pattern AR9 or AR10 (see FIG. 6) corresponding to a secondary color, a gloss level of the pattern AR8 corresponding to a tertiary color, a gloss level of the pattern AR7 corresponding to a quaternary color, and a gloss level of the base material portion, and additionally acquires a gloss level of the pattern AR12 in a tertiary color with a small total amount of recording materials and a gloss level of the pattern AR11 in a quaternary color with a large total amount of recording materials.

In the case of FIG. 12, the pattern AR12 in a tertiary color with a small total amount of recording materials is a pattern output at a tone level for each color of 40%. On the other hand, the pattern AR11 in a quaternary color with a large total amount of recording materials is a pattern output at a tone level for each color of 80%.

The evaluation value calculation unit 203D calculates an evaluation value of a relief feel on the basis of the acquired three types of step heights, gloss levels of three types of image portions corresponding thereto, gloss level difference between the image portion in a quaternary color and the base material portion, and gloss level difference between the two image portions with different total amounts of recording materials used. Specifically, the evaluation value calculation unit 203D calculates an evaluation value of a relief feel using the following formula.

Evaluation value=$k41$×step height×gloss level (secondary color)+$k42$×step height×gloss level (tertiary color)+$k43$×step height×gloss level (quaternary color)+$k44$×gloss level difference (between image portion at tone level of 100% and base material portion)+$k45$×gloss level difference (between image portion at tone level of 40% and image portion at tone level of 80%) (Formula 5)

In the formula, k41, k42, k43, k44, and k45 are each a coefficient. The values of k41, k42, k43, k44, and k45 are given in advance.

The evaluation value calculation unit 203D according to the present exemplary embodiment calculates an evaluation value using, as constants, the gloss level difference between the base material portion and the image portion at a tone level of 10% and additionally the gloss level difference between the image portion at a tone level of 40% and the image portion at a tone level of 80%. The image portion at a tone level of 40% is an example of a first image portion, and has a first thickness. The image portion at a tone level of 80% is an example of a second image portion, and has a second thickness (>first thickness).

The present exemplary embodiment is different from the fourth exemplary embodiment in that an evaluation value is calculated using the gloss level difference between the image portion at a tone level of 40% and the image portion at a tone level of 80%.

The evaluation value calculation unit 203D according to the present exemplary embodiment is able to calculate an overall evaluation value, including not only the gloss level difference between the base material portion and the image portion but also the gloss level difference between two types of image portions at different tone levels. While a plurality of image portions with the same color tone but with different amounts of recording materials are formed on the actual printed matter, it is possible to make an overall evaluation of a relief feel using Formula 5.

While an evaluation value is calculated using the step height in the present exemplary embodiment, an evaluation value may be calculated using the step tilt as in the second exemplary embodiment.

OTHER EXEMPLARY EMBODIMENTS (1) While exemplary embodiments of the present disclosure have been described above, the technical scope of the present disclosure is not limited to the exemplary embodiments discussed earlier. It is apparent from the following claims that a variety of modifications and improvements that may be made to the exemplary embodiments discussed earlier also fall within the technical scope of the present disclosure.

(2) While the image quality evaluation apparatus 1 including all of the light source 107 and the specular reflected light receiver 108 which are used to measure a gloss level, the surface height measurer 109 which measures roughness formed on the surface of printed matter, and the processor 101 which evaluates a relief feel has been described in the exemplary embodiments discussed earlier, the present disclosure may be implemented as a system that communicably connects a plurality of devices corresponding to the functions.

For example, the present disclosure may be implemented as an image quality evaluation system in which a gloss meter that includes the light source 107 and the specular reflected light receiver 108 which measure a gloss level, a device that includes the surface height measurer 109, and an information processing apparatus that includes the processor 101 are connected to each other by way of a communication line or a network, or may be implemented as an image quality evaluation system in which the light source 107 and the specular reflected light receiver 108 which measure a gloss level, a device that includes the surface height measurer 109, and an information processing apparatus that includes the processor 101 are connected to each other by way of a communication line or a network.

(3) While a white light source is used as the light source 107 (see FIG. 1) in the exemplary embodiments discussed earlier, the illumination light may be in any color. The illumination light is not limited to visible light, and may be infrared light, ultraviolet light, etc.

(4) While the base material portion is assumed to be a region in which the base material such as paper is exposed in the exemplary embodiments discussed earlier, the printing region that is used as the ground of the image portion may be a region in which a halftone pattern has been printed. The halftone pattern is a pattern that expresses concentration using dots of different sizes.

(5) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image quality evaluation method to be executed by an information processing apparatus, the image quality evaluation method comprising:
    acquiring information about a step at a boundary portion between an image portion, which is formed using a recording material, and a base material portion, which is a ground of the image portion, and a gloss level of the image portion; and
    calculating an evaluation value of a relief feel on a basis of the acquired information about the step and the gloss level,
    wherein the calculating includes calculating the evaluation value using a difference in the gloss level between a first image portion with a first thickness and a second image portion with a second thickness in addition to the information about the step and the gloss level, and
    wherein the first thickness and the second thickness have different thickness values.

2. The image quality evaluation method according to claim 1,
    wherein the calculating includes calculating the evaluation value using a difference in the gloss level between the base material portion and the image portion in addition to the information about the step and the gloss level.

3. The image quality evaluation method according to claim 2,
    wherein the information about the step includes a height of the step between the base material portion and the image portion.

4. The image quality evaluation method according to claim 2,
    wherein the acquiring includes measuring a height of the step between the base material portion and the image portion as the information about the step.

5. The image quality evaluation method according to claim 2,
    wherein the information about the step includes an inclination angle of a connection portion between the image portion and the base material portion.

6. The image quality evaluation method according to claim 2,
    wherein the acquiring includes measuring an inclination angle of a connection portion between the image portion and the base material portion as the information about the step.

7. The image quality evaluation method according to claim 2,
    wherein the acquiring includes measuring the information about the step and the gloss level for a specific region of printed matter to be used for evaluation.

8. The image quality evaluation method according to claim 7,
    wherein the specific region includes a plurality of image portions with different thicknesses of stacked recording materials, and
    the calculating includes calculating a total sum of evaluation values for the plurality of image portions.

9. The image quality evaluation method according to claim 1, wherein the information about the step includes a height of the step between the base material portion and the image portion.

10. The image quality evaluation method according to claim 1,
wherein the acquiring includes measuring a height of the step between the base material portion and the image portion as the information about the step.

11. The image quality evaluation method according to claim 1,
wherein the information about the step includes an inclination angle of a connection portion between the image portion and the base material portion.

12. The image quality evaluation method according to claim 1,
wherein the acquiring includes measuring an inclination angle of a connection portion between the image portion and the base material portion as the information about the step.

13. The image quality evaluation method according to claim 1,
wherein the acquiring includes measuring the information about the step and the gloss level for a specific region of printed matter to be used for evaluation.

14. The image quality evaluation method according to claim 13,
wherein the specific region includes a plurality of image portions with different thicknesses of stacked recording materials, and
the calculating includes calculating a total sum of evaluation values for the plurality of image portions.

15. The image quality evaluation method according to claim 1, further comprising:
displaying a line that gives an allowable range and the calculated evaluation value in a chart defined by a first axis that represents the information about the step and a second axis that represents the gloss level.

16. The image quality evaluation method according to claim 2, further comprising:
displaying a line that gives an allowable range and the calculated evaluation value in a chart defined by a first axis that represents the information about the step and a second axis that represents the gloss level.

17. An image quality evaluation apparatus comprising:
a processor configured to:
acquire information about a step at a boundary portion between an image portion, which is formed using a recording material, and a base material portion, which is a ground of the image portion, and a gloss level of the image portion; and
calculate an evaluation value of a relief feel on a basis of the acquired information about the step and the gloss level,
wherein the calculation includes calculating the evaluation value using a difference in the gloss level between a first image portion with a first thickness and a second image portion with a second thickness in addition to the information about the step and the gloss level, and
wherein the first thickness and the second thickness have different thickness values.

18. A non-transitory computer readable medium storing a program causing a computer to execute a process comprising:
acquiring information about a step at a boundary portion between an image portion, which is formed using a recording material, and a base material portion, which is a ground of the image portion, and a gloss level of the image portion; and
calculating an evaluation value of a relief feel on a basis of the acquired information about the step and the gloss level,
wherein the calculating includes calculating the evaluation value using a difference in the gloss level between a first image portion with a first thickness and a second image portion with a second thickness in addition to the information about the step and the gloss level, and
wherein the first thickness and the second thickness have different thickness values.

* * * * *